United States Patent [19]

Cislak et al.

[11] 4,126,923
[45] Nov. 28, 1978

[54] METHOD FOR ATTACHING A PLASTIC COVER AND APPARATUS EMPLOYING SAME

[75] Inventors: Raymond S. Cislak, Chicago Heights, Ill.; Louis Romanzi, Jr., Milford, Mich.

[73] Assignee: Gateway Industries, Inc., Chicago, Ill.

[21] Appl. No.: 749,176

[22] Filed: Dec. 9, 1976

[51] Int. Cl.² ............................................. B23P 17/00
[52] U.S. Cl. ...................................... 29/416; 29/235; 29/453; 220/324
[58] Field of Search ........................ 29/453, 416, 235; 227/16; 220/324

[56] References Cited

U.S. PATENT DOCUMENTS

| | | | |
|---|---|---|---|
| 2,657,894 | 11/1953 | Sklenar | 29/453 UX |
| 2,894,426 | 7/1959 | Rapata | 29/416 UX |
| 2,947,071 | 8/1960 | Marchant | 29/235 |
| 2,948,958 | 8/1960 | Flora | 29/416 X |
| 3,057,647 | 10/1962 | Wood | 29/416 UX |
| 3,159,318 | 12/1964 | Green | 29/416 UX |
| 3,273,234 | 9/1966 | Henchert | 29/453 |
| 3,468,013 | 9/1969 | Sciamonte et al. | 29/235 X |
| 3,645,758 | 2/1972 | MacManus | 220/324 X |

Primary Examiner—Charlie T. Moon
Attorney, Agent, or Firm—Fitch, Even, Tabin & Luedeka

[57] ABSTRACT

A method and apparatus employing the method are disclosed for attaching a plastic cover to a safety belt retractor frame. A plastic cover having a pair of spaced legs is attached to a seat belt retractor frame by inserting the legs through an opening in the retractor frame and wedging a plastic plug between the legs to hold them tightly in the opening and restrict withdrawal from the opening.

13 Claims, 11 Drawing Figures

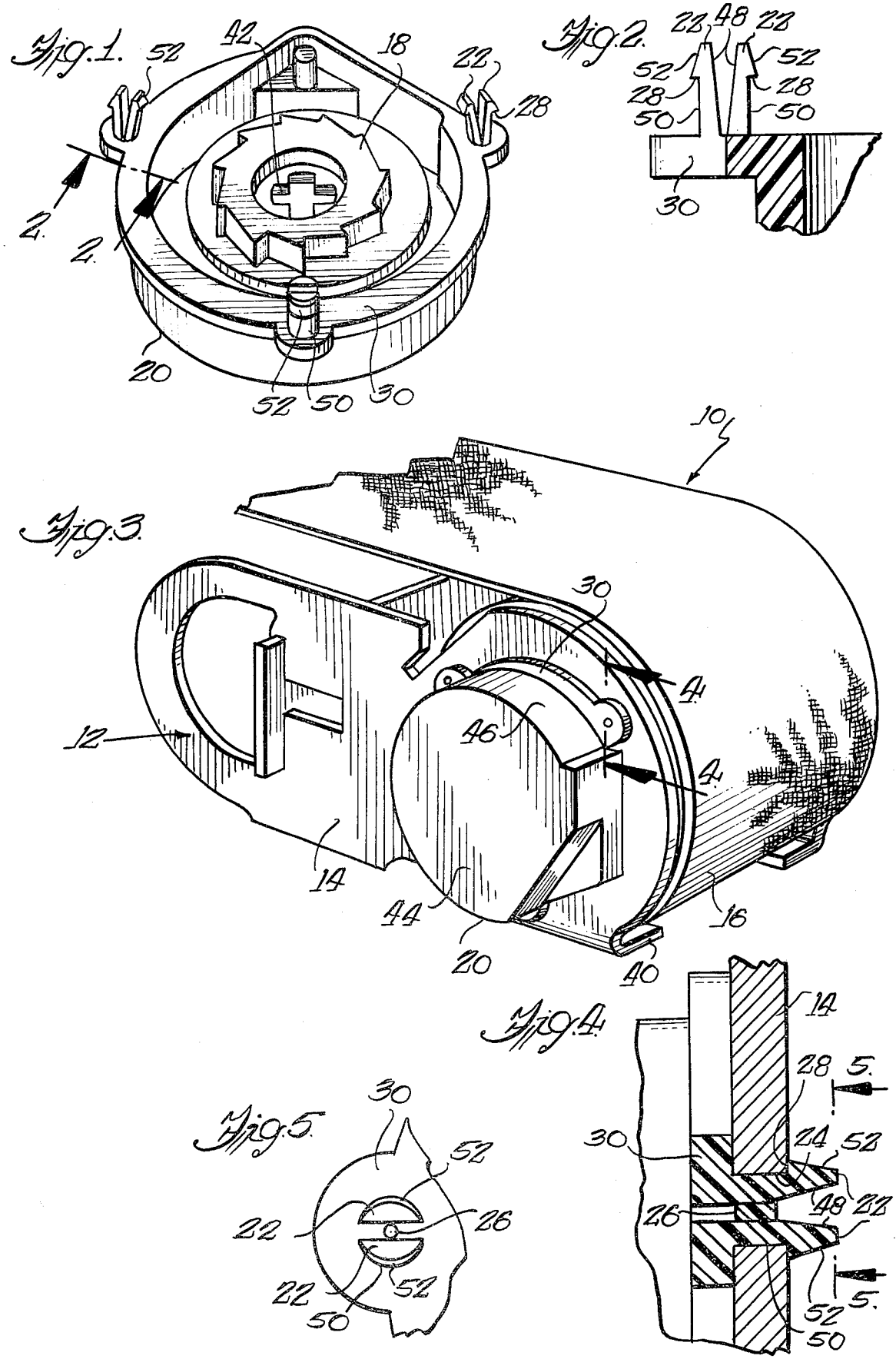

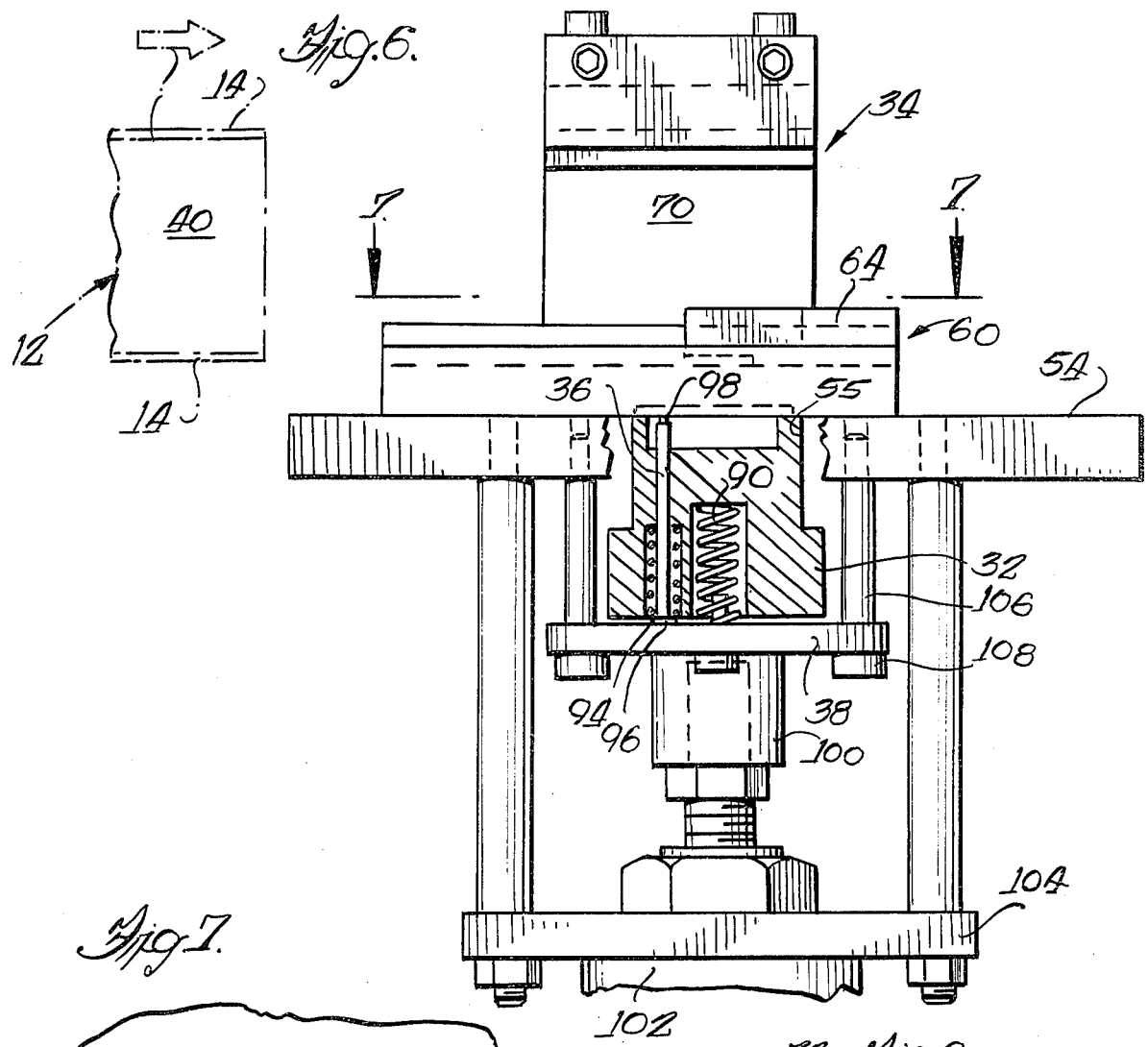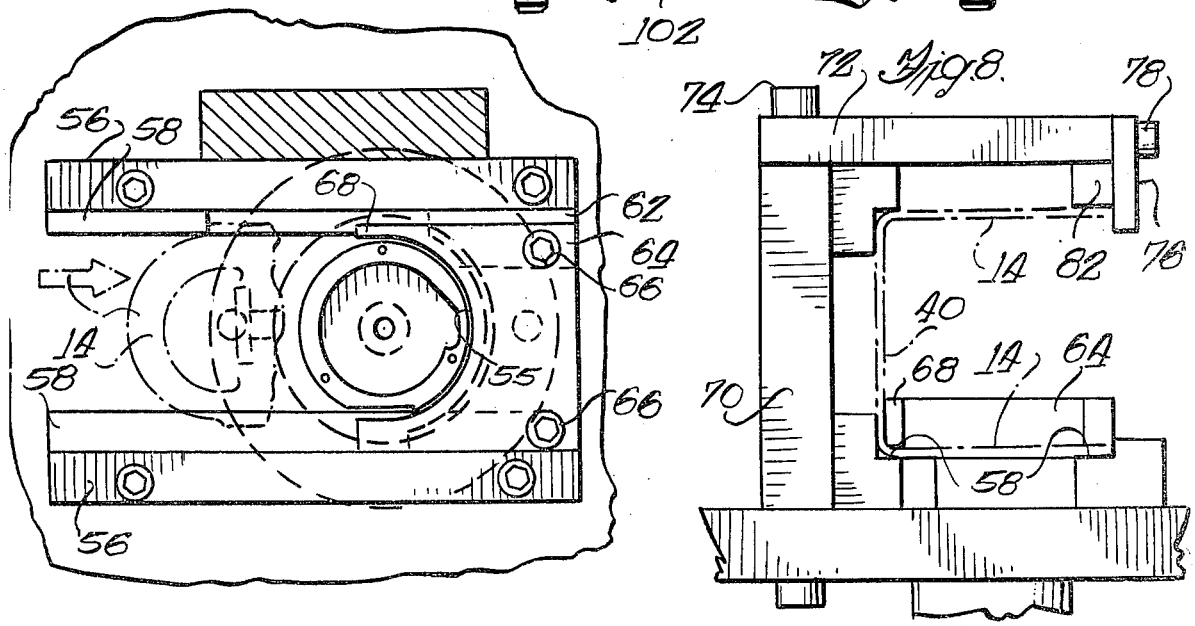

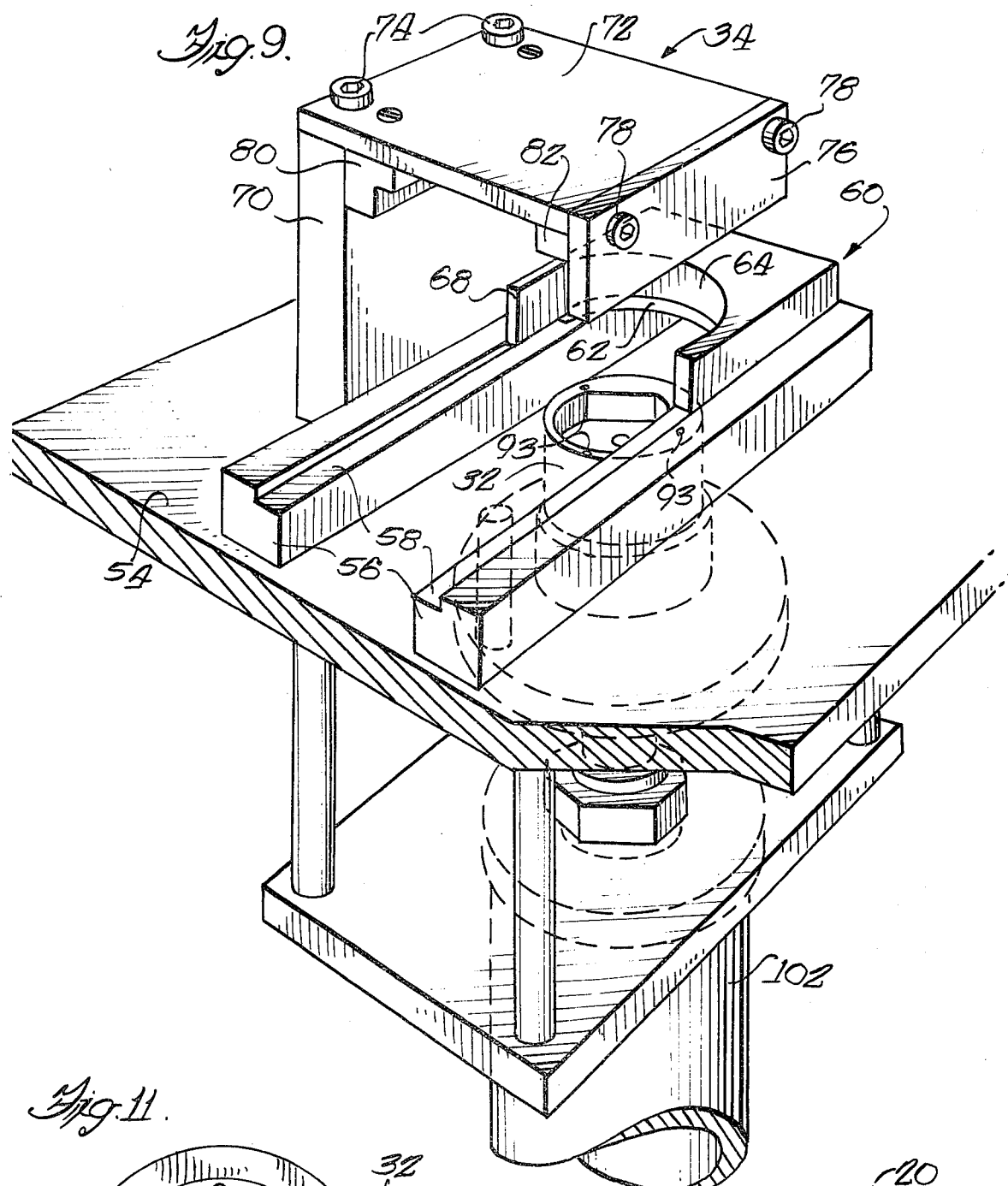
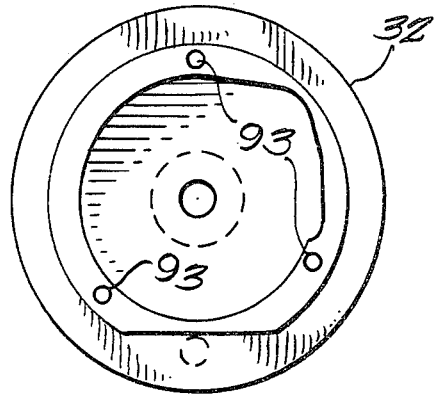
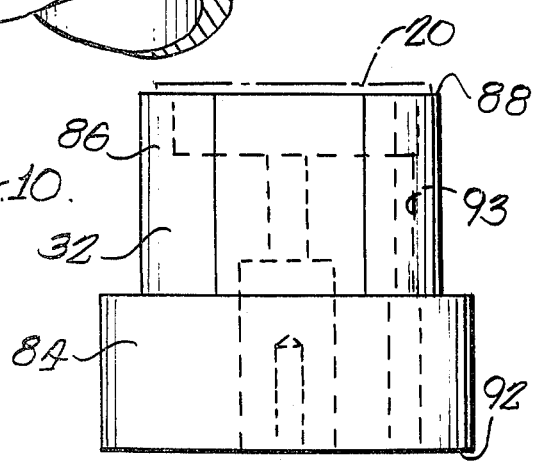

METHOD FOR ATTACHING A PLASTIC COVER AND APPARATUS EMPLOYING SAME

The present invention relates generally to safety belt retractors and more particularly to the method and means for attaching plastic covers to safety belt retractor frames.

Safety belt retractors usually include a main carriage or frame upon which the safety belt winding reel and associated mechanisms are mounted. The retractor frame usually has a base plate with upstanding side plates. The reel is mounted between the side plates, and apparatus or mechanisms associated with the reel, such as coil rewind springs or tension locks, are mounted on the outside of the side plates and engage the end of the reel that extends through the side plate. Compare, for example, U.S. Pat. No. 3,869,098, which illustrates a typical safety belt retractor frame, with the belt reel mounted between side plates and with a winding prevention mechanism secured on the outside of the side plate.

The various reel-associated mechanisms are usually enclosed by shallow plastic cups or caps which are attached to the retractor frame. These covers serve not only to protect against dust or dirt, but often they are actually attached to or engaged against the mechanism enclosed and are an important part of the operation of the device. For example, in some retractors, the tension lock or retractor control mechanism is actually mounted on a center spindle inside the cover. The cover is mounted on the side plate of the retractor and the belt reel extends through the plate to engage the winding control mechanism. U.S. Pat. No. 3,861,696 illustrates this construction. A coil spring for rewinding the belt reel may also be enclosed in the plastic cover, with the cover serving as a stationary connection for one end of the spring, the other end being attached to the belt reel. In both cases, if the cover is not securely attached to the retractor frame or accidentally releases from the frame the safety belt will not function properly. If a tension lock fails because the cap or cover disengages from the side plate of the retractor frame, the safety belt will continually, and uncomfortably, exert a pulling force against the passenger. If a rewind spring is enclosed, failure of the cover may prevent the safety belt from rewinding properly. Equally important, failure of a cover over a rewind spring may permit the spring to fly off the belt reel, presenting a hazard to persons nearby. This problem is more prevalent in assembly, installation or repair of safety belt retractors when workmen are exposed.

Accordingly, for safety belt retractors to work properly and safely, the plastic covers must be securely attached to the retractor frames. In the past, some plastic covers have utilized a "snap-in" action, with spaced resilient legs which are inserted through openings in the retractor frame. The resilient legs include radial shoulders with sloped sides which cause the legs to compress together as they are inserted through the openings. After the shoulders are beyond the inside edge of the side plate the resilient legs spring apart and the shoulders hook over the edge of the opening to restrict withdrawal of the legs and thereby hold the cover in place. However, because the legs are resilient and may flex sufficiently to permit the shoulders to disengage when force is applied to the cover, this kind of simple snap-in attachment has proven unsatisfactory.

Hot swaging the ends of the plastic legs after they have been inserted through the frame has also been tried. Although the cover is held more securely in place than in the snap-in arrangement, the swaging operation is manual, adding to product cost, and plastic builds up on the swaging tool after repeated use, eventually requiring cleaning and possibly preventing the tool from being used in narrow spaces in the retractor frame. Rivets have also been used to attach covers to retractor frames. But this requires additional operations as well as materials and thus increases the cost.

Accordingly, it is an object of the present invention to provide an efficient and low cost method and apparatus for securely attaching plastic covers to retractor frames.

It is further object of the present invention to provide method and apparatus for attaching plastic covers to retractor frames without the need for additional parts or manual operations.

These objects are met by the present invention by providing a method and apparatus for inserting and locking spaced resilient legs of a plastic cover in openings in a retractor frame. The legs may include shoulders or other means for gripping or abutting the frame. After the legs are inserted, a plastic plug is wedged between the legs to prevent the legs from disengaging from the frame and thereby preventing accidental release of the cover. Preferably, a staking pin is used to punch out a plastic plug from the cover portion behind the legs and to press the plug to between the legs in one direct motion, wedging the legs apart and preventing flexing of the legs and consequent disengagement of the shoulders from the frame.

These and other objects of the invention are disclosed in the following detailed description and the attached drawings, of which, FIG. 1 is a perspective view of a plastic cover enclosing a tension lock device which is to be attached to a retractor frame.

FIG. 2 is an enlarged view of the spaced attaching legs of the cover taken along line 2—2 of FIG. 1.

FIG. 3 is a perspective view of a safety belt retractor frame with an attached side cover embodying the present invention.

FIG. 4 is a sectional view taken along lines 4—4 of FIG. 3.

FIG. 5 is a side view taken along line 5—5 of FIG. 4.

FIG. 6 is a plan view, partially in section, of a machine embodying the present invention for attaching plastic covers to retractor frames.

FIG. 7 is an enlarged view taken along line 7—7 of FIG. 6.

FIG. 8 is a partial left side view of the machine illustrated in FIG. 6.

FIG. 9 is a perspective view, partially in section of the machine illustrated in FIG. 6.

FIG. 10 is a front view of a die used in the machine embodying the present invention.

FIG. 11 is a plan view of the die shown in FIG. 10.

The present invention is generally embodied in a safety belt retractor 10 and in the method and machinery for manufacturing the same. The retractor includes a frame or carriage generally at 12, with an upstanding side plate 14 on each side of a safety belt retractor reel 16. The retractor reel extends through the side plates to engage mechanisms, such as a tension lock device 18 shown in FIG. 1. These mechanisms are enclosed by a shallow plastic cap or cover 20 which are mounted against the side plate of the retractor frame.

In accordance with the present invention, the cover 20 is simply, but securely and permanently, attached to the side plate 14 of the retractor frame 12 by inserting flexible spaced legs 22 through openings 24 in the retractor frame and wedging a plastic plug 26 between the legs to hold the legs apart and to prevent disengagement of shoulders 28 on the legs from the inside of the side plate. The plastic plug may be formed and inserted between the spaced legs by punching out a portion of a radial ring 30 behind the spaced legs and forcing it to between the legs. This is most easily accomplished with a machine such as that illustrated in FIGS. 6 et seq. The cover is deposited in the upper end of a die 32, which is spaced below a holding frame, generally at 34, for holding the retractor frame in stationary position. Staking pins 36 extend through the die from beneath the radial flange of the cover to below the opposite end of the die. After the cover is deposited into the die with the radial flange overlying the staking pins at the location of the spaced legs 22, the retractor frame is inserted into the holding frame above the die, with a side plate facing down. A ram 38 may then be activated to drive the die toward the retractor frame, pushing the spaced fingers of the cover into the openings in the side plate. The ram also engages the staking pins which extend to below the die, forcing the staking pins upward through the radial flange and driving a plug portion of the flange to between the spaced legs. This plug, wedged between the legs, prevents flexing of the legs and holds them tightly within the openings in the side plate.

Turning now to a more detailed description of the present invention, which is shown in its preferred embodiment for illustration only, the retractor frame 12 is the main structural member of the safety belt retractor. It is generally of one-piece metallic construction of sufficient strength to resist the acceleration and vibration forces which may be applied against the safety belt system. The frame is formed by bending the side plates 14 upwardly along the side edges of a base plate portion 40. One end of the retractor frame includes means (not shown) for attaching the frame to a structural member of the vehicle in which it is utilized. At the other end, the safety belt reel 16 is mounted between the side plates and securely attached to them, usually by a central axle which extends through openings in the plates. (not shown) Several small openings 24 are drilled or stamped into the side plate around the axle for attachment of the cover 20 over the end of the axle. The position of the openings corresponds to the location of the pairs of spaced legs 22 on the cover which is to be attached.

Any selected mechanism, such as the tension lock device 18 or a retractor spring, or none at all, may be attached to the end of the belt reel axle. The tension lock device illustrated in FIG. 1 relieves the passenger from constant belt pull after the belt is adjusted. The tension lock is mounted on a central, recessed spindle (not shown) extending from the inside of the cover. Central slots 42 in the tension lock are designed to engage over a mating end of the reel axle.

The cover 20 which surrounds the tension lock is a shallow cup or cap, with a flat bottom wall 44 and a continuous side wall 46 extending perpendicularly from the edge of the bottom wall. The illustrated cover is generally circular except for an irregular portion (best seen in FIG. 3) formed by flat side walls intersecting to form a angular extension. The radial flange 30 extends perpendicularly from the edge of the side wall along the circular portion of the cover but not the irregular portion.

For attaching the cover 20 to the side plate 14 of the retractor frame 12, pairs of spaced legs 22 extend upwardly from the radial flange 30 at selected intervals therealong. At the locations of the spaced legs the radial flange is wider to permit proper spacing of the legs from the side wall. Preferably, the entire cover, including the bottom wall 44, side wall 46, radial flange and spaced legs are of one-piece, molded plastic construction. Although a variety of plastics sufficiently strong, resilient, easy to mold and relatively inexpensive may be used, nylon is the preferred material.

Each leg 22 is back-to-back with a substantially identical leg to form an adjacent pair of legs, and a description of one leg or one pair applies equally to all other legs and all pairs. Each leg of a pair has a generally flat back-to-back facing surface 48 with a curved front surface 50 facing away from the paired leg. The legs taper from a generally semi-circular cross-sectional shape at the radial flange 30 to a smaller end. As may be seen in FIGS. 2 and 4, this creates a V-shaped space or notch between the legs of each pair. To hook over the inside edge of the openings 24 in the side plate 14 and thereby restrict withdrawal of the legs from the openings, the radially extending shoulder 28, defined by a surface perpendicular to curved front surface 50, is provided on each leg between the flange 30 and the end of the leg. The shoulder must be spaced from the flange a distance at least equal the thickness of the retractor frame. Otherwise the legs could not be inserted far enough through the opening for the shoulder to overlap the inside edge.

Each pair of legs may also be described, somewhat differently, as a single upstanding cylindrical insertion post with a pair of oppositely facing shoulders near the end and a V-shaped notch between the shoulders, dividing the insert into a spaced pair of identical legs, facing back-to-back.

To guide each pair of legs 22 into the selected opening 24 in the side wall 14, an outside facing cam surface 52 extends between the edge of the shoulder 28 and the free end of the leg. The cam surface serves to engage the edge of the opening 24 as the legs are pushed thereagainst, thereby guiding the legs into the opening and simultaneously squeezing each pair of legs together for insertion therethrough. In other words, as each pair of legs is pushed into an opening in the retractor frame, the cam surface slides across the edge of the opening, forcing the legs together until they are sufficiently close to be inserted through the opening. After the shoulder 28 passes the inside edge of the retractor frame the resilient legs spring apart with the shoulder hooking over the edge of the frame.

The resilience of the legs 22 is due in large part to the plastic construction, preferably nylon, of which the entire cover 20 is constructed. However, because of the resilience of the nylon legs, they may flex when various forces are applied against the cover and permit the shoulders 28 to disengage from the side plate 14. To lock the legs 22 in a spaced relationship and to prevent flexing of the legs sufficient for the shoulders to disengage from the edge of the retractor frame, the plastic plug 26 is formed and then wedged tightly between the legs. The plug may be formed as an entirely separate step from other materials and then inserted and wedged between the legs. As more clearly seen in FIGS. 4 and 5, the plug is preferably, and most conveniently, formed and inserted by driving a portion of the radial flange 30 from behind the legs directly to a location between the legs within the opening in the retractor frame side plate. In this manner a plug having a length equal to the thickness of the radial flange, less the amount compressed, is wedged between the legs. The plug should be sufficiently thick to wedge tightly between the legs but not so thick as to weaken the flange or the legs when punched from the flange to between the legs. In the preferred embodiment the staking pin which is used to drive a plug from the flange to between a pair of legs has a tapered end about 0.065 inches in average diameter. The legs between which the plug is inserted have a base, semicircular diameter of about 0.125 inches. The plug is preferably driven to a position substantially within the opening in the side plate of the retractor frame. As illustrated, the plug may be positioned completely within the opening between the edges of the side plate.

Apparatus for attaching the cover 20 to the side plate 14 of the safety belt frame 12 is illustrated in detail in FIGS. 6 through 11. Briefly, the holding frame 34 serves to lock the retractor frame 12 in a stationary position, with the side plate to which the cover is to be attached facing downward. The cover is nested in the top end of the die 32 below the holding frame, with the spaced legs 22 pointed upwardly in registration with the openings 24 in the side plate. Staking pins 36 extend through the die from just below the radial flange 30 of the cover to beyond the bottom of the die. The top end of each pin is positioned below one of the pairs of spaced legs 22. The other ends of the die and staking pins rest atop the ram 38. When the ram is driven upwardly, the die forces the spaced legs of the cover through the openings in the side plate and the ram drives the staking pins through the flange to force or punch a plug portion of the flange to a position between the legs, thereby holding the legs apart and preventing disengagement of the shoulders 28. Thus the cover is securely attached in one simple machine operation, with a minimum of complicated machinery or procedures.

The holding frame, generally at 34, is mounted in a flat, rectangular machine surface 54 which has a center bore 55 sufficiently large for the insertion of the die 32 from therebelow. The holding frame is adapted to lock the retractor frame in a stationary position over the center bore. The holding frame includes a pair of spaced, parallel L-shaped channels 56 attached directly on the top of the machine surface and on each side of the center bore. The channels are facing to provide slideways surfaces 58 along which the retractor frame may move.

To stop the retractor frame at a location in proper alignment with the center bore 55, the holding frame includes a stop 60 extending between the channels 56 on one side of the center bore. The stop is preferably of two-part construction — a lower plate 62 with a recessed curvilinear front edge and a U-shaped upper plate 64 which are attached together by screws 66 (FIG. 7). The lower plate extends fully between the parallel channels 56 and rests on the slideway surfaces 58.

As noted earlier, the retractor frame 12 is slid along the channels 56 with the side plate 14 facing down. FIGS. 6-8 illustrate the retractor frame in phantom and the phantom arrow indicates the insertion of the retractor frame into the holding frame. The base plate portion 40 of the frame is preferably to the rear, (FIGS. 6-8), and the stop 60 is located so that it abuts the leading edge of the downward facing side plate when the plate is properly aligned with the center bore 55 in the machine surface 54. But in addition to acting as an alignment device, the stop 60 also acts to hold the retractor frame against vertical and horizontal movement. The front edge of the lower plate 62 of the two-part stop is recessed from the front edge of the top plate 64. So, when the retractor frame is slid along the channels to abut the stop, the leading edge of the downward facing side plate extends under the top plate of the stop, which acts as a holddown or clamp against vertical movement of the retractor frame. Horizontal restraint on the retractor frame is provided by a rear leg 68 of the top plate of the stop. The leg 68 is spaced from the inside of the channel 56, and when the retractor frame is slid into place, the base plate portion 40 of the retractor frame is inserted between the rear leg and the channel (FIG. 8).

The holding frame 34 provides additional vertical restraint on the retractor frame by providing a holddown along the top of the frame. More specifically, rectangular backplate 70 extends vertically from the machine surface 54 along the outside of one of the channels 56. A cover plate 72 is attached to the upper edge of the backplate by a pair of screws 74 and extends outwardly, over the bottom channels. A front plate 76 depends for a short distance from the front edge of the top plate, and is attached to the top plate by screws 78. To hold the retractor frame down, an L-shaped channel 80 is secured at the inside junction between the top plate and the backplate. The channel 80 is parallel to the bottom channels 56 and positioned to slidably engage the retractor frame at the corner between the upward facing side plate 14 and the base plate 40. A rectangular bar 82 at the corner between the top plate 72 and the front plate 76 also provides a slideway, parallel to the channels 56 and 80, over the top of the upperward facing side plate, thereby holding the retractor frame against upward movement.

The operation of the holding frame is thus relatively clear. The retractor frame 12, with the selected side plate 14 facing downward, is placed upon the bottom channels 56 which extend out from under the cover plate 72. The retractor is then slid along the channels, beneath the cover plate, where the channel 80 and bar 82 slidably engage over the upward facing side plate, until the frame abuts the stop 60, which indicates that it is in position, properly aligned with the center bore 55 in the machine surface 54. In this position, vertical movement of the retractor frame is prevented by the stop which overhangs the leading edge of the side plate and by the channel 80 and bar 60 which are engaged against the upward facing side plate to provide a holddown. And horizontal movement in one direction is restricted by the insertion of the leading edge of the base portion 40 of the retractor frame between the rear leg 68 of the stop and the channel 56.

To attach the cover 20 to the downward facing side plate, the die 32 is mounted within the center bore 55 in the machine surface. The die is of generally cylindrical construction with a cylindrical base portion 84 and a narrower cylindrical upper portion 86. The die is preferably metallic but may be fabricated of any other material of sufficient strength. The upper surface of the die is recessed, as by machining or molding, to conform to the shape of the cover which is to be deposited therein. In the present embodiment, the recess is shallow, cup shaped with an irregular angular portion. (See FIG. 11). Preferably, the recess in the die only receives the bottom and side walls of the cup, and the radial flange overlaps the top surface of the die. (FIG. 10). The lower end of the die is centrally bored to receive a coil spring 90.

For inserting the staking pins 36, the die 32 is drilled completely between the upper surfaces 88 and the bottom surface 92. The spacing and number of drillings corresponds to the spacing and number of pairs of spaced legs 22 in the cover 20. Because the shape of the cover is irregular and the recess in the end of the die corresponds to the cover shape, the cover and the spaced legs are always in the same predictable position when inserted into the die. Accordingly, the die is drilled at each location of the spaced legs for insertion of a staking pin. With a cover like that illustrated in FIG. 1 with three pair of attaching leg spaces around the flange 30, the die is drilled for three staking pins to extend to just below the spaced legs. The numeral 93 indicates the drill holes in FIGS. 9–11. The staking pin hole is drilled larger in the lower portion of the die for insertion of a coil spring 94 around the staking pin.

Turning to the staking pins themselves, each staking pin 36 is long, metallic and generally cylindrical in shape. A wider cylindrical base 96 is attached to one end of the pin and slightly tapered punch portion 98 is provided at the other end. The punch portion is sufficiently long to extend substantially through the radial flange 30 of the cover 20 and sufficiently thick to punch out a portion of the flange that will wedge tightly between the legs 22. In the preferred embodiment, the punch portion has a diameter of about 0.065 inches for punching plug to tightly wedge between spaced legs having an overall diameter of about 0.125 inches. Overall, the staking pin is longer than the die by a selected amount at least equal to the thickness of the radial flange of the cover.

The staking pins are inserted into die 32 from the bottom. Before they are inserted, the coil spring 94 is placed over the pin, resting upon the cylindrical base 96. The portion of the staking pin hole with a larger diameter for insertion of the coil spring is shorter than the spring, thus putting the spring under compression when the pin is inserted.

The die 32 and staking pins 36 rest atop the ram 38. The ram is generally a flat disc with a center, downward extending shank 100 attached in the usual manner to a hydraulic cylinder 102 therebelow. The hydraulic cylinder is rigidly held in place by a bracket 104 which is bolted to the underside of the machine surface 54. Guide pins 106 extend through the ram and are attached below the machine surface 54. Large heads 108 on the guide pins prevent the ram from retracting too far and dislodging the die from the center bore 55 in the machine surface or permitting the staking pins to fall from the die.

The ram 38 is generally horizontal with a flat upper surface upon which the die and staking pins rest. The die is actually supported above the surface of the ram by the large coil spring 90 which extends into the center bore in the lower end of the die. The spring keeps the die in a slightly raised position in the center bore 55 of the machine surface even when the ram is retracted. The coil spring 94 around the staking pin, which is in compression, keeps the cylindrical base 96 of the pin in actual contact with the top surface of the ram.

With this construction, when a cover is nested in the upper end of the die, and a retractor frame is properly positioned in the holding frame, the cover may be simply and quickly attached to the retractor frame by activating the hydraulic cylinder 102.

The cylinder drives the ram upwardly, forcing the die and cover against side plate of the retractor frame, and the spaced legs 22 of the cover into openings 24 in the side plate. The length of the ram stroke must at least be sufficient to drive the legs far enough into the openings for the shoulders 28 to hook over the inside edge of the frame. The ram also engages the cylindrical bases 96 of the staking pins, forcing the pins upwardly through the radial flange 30 to punch a plastic plug from the flange to between the spaced legs.

The distance the staking pins 36 are driven through the radial flange 30 is a function of the amount by which the length of the staking pins exceeds the length of the die 32. The drilled staking pin holes 93 in the die are large enough for the base 96 of each staking pin to be pushed thereinto upon the upward stroke of the ram 38. Thus, when the ram impacts the bottom surface 92 (also called impact surface) of the die, the staking pin is driven through the die and the radial flange by an amount equal to the difference between the length of the pin and the die. This distance, which is also approximately equal to the length of the punch portion 98 of the staking pin, must be determined so that the plug 26 is wedged tightly between the legs. This will depend on the thickness of the radial flange 30 and the size of the legs in the particular cover.

The actual operational sequence may vary. If the coil spring 90 is strong and stiff, sufficient force may be exerted against the die to cause insertion of the spaced legs 22 into the opening 24 in the side plate 14 before the ram moves toward the die far enough to drive the staking pins into the radial flange 30. The spring stiffness required for this sequence depends on the resistance of the legs to insertion in the openings, which is a function of the slope of the cam surface 52 on the legs and the resilience of the legs. If the spring is stiff enough to easily overcome these cumulative resistant forces, the legs will likely be snapped into the openings in the side plate before the staking pins are driven into the flange 30.

If the spring 90 is not sufficiently strong, the staking pins 36 may engage the radial flange 30 before the spaced legs 22 are completely inserted into the openings 24 in the side plate. In this case, the staking pins, alone or in combination with the die 32, drive the legs through the openings. However, either mode of operation described above is satisfactory so long as the staking pins do not drive the plug portion 26 from the radial flange before the legs are inserted substantially into the openings.

The apparatus described above may be operated automatically or manually. The cover 20 is first deposited into the upper end of the die 32, nesting in the matching recess. A retractor frame 12 is then slid into a holding frame above the die. The die and holding frame are positioned so that the spaced legs 22 of the cover are in registration with openings 24 in the side plate 14 of the retractor frame. The operator then activates the hydraulically-operated ram 38 which drives the die toward the side plate, inserting the legs into the openings at least until the shoulders 28 hook over the inside edges. The ram also drives staking pins through the radial flange of the cover to force plug portion of the cover to positions between the legs, preventing them from flexing and accidentally permitting the shoulder to disengage.

The hydraulic ram may then be retracted, and the retractor frame with a permanently attached cover may be removed.

In summary, the present invention presents a unique method and apparatus for attaching plastic covers to safety belt retractor frames. Spaced legs on the cover are inserted into an opening in the frame, a plastic plug is formed and inserted between the legs to wedge them tightly apart. When the legs are carried on a flange, the plug may be mostly conveniently formed and inserted by punching it from the flange behind the legs to directly between the legs.

Apparatus employing the invention utilizes a die in which the cover is first deposited, the safety belt retractor frame is then slid into a holding frame above the die to hold the retractor frame in a stationary position. A ram drives the die against the retractor frame inserting spaced legs from the cover into openings in the frame. The die may also include staking pins, which are driven by the same ram through the radial flange, thereby punching a portion of the flange to between the legs and wedging them apart within the opening.

The preferred embodiment present invention has been described for illustration only. It is not intended to disclaim the use of equivalent steps or apparatus, some may be obvious immediately and others only after study.

Various of the features of the invention are set forth in the following claims.

We claim:

1. A method for permanently attaching a plastic cover having a plurality of interlocking means each having at least a pair of spaced legs to a device having openings each for receiving said legs of an associated interlocking means, said method comprising aligning the plurality of pairs of spaced legs each with one of said openings, simultaneously inserting each one of said pair of said legs into one of said openings, simultaneously forming plastic plugs by punching out an integral portion of said cover at each location between a pair of said legs and simultaneously inserting each of said plugs between said legs to hold them tightly and permanently in said openings.

2. A method in accordance with claim 1 in which the steps of inserting the plug includes forcing the punched-out plug in an axial direction from the hole formed thereby in said cover.

3. A method for permanently attaching a plastic cover having a flange with at least one pair of spaced resilient legs extending therefrom at several spaced locations about said flange to a safety belt retractor frame having openings for receiving said legs, said legs including gripping means to engage said frame to restrict withdrawal of said legs from said opening, said method comprising aligning the spaced legs at said several locations with an associated opening, simultaneously inserting said legs into said opening at least until said gripping means engages said frame and punching a plastic plug directly from said flange at each of said locations, inserting each of said plastic plugs between said legs; said plugs thereby holding said legs apart and preventing flexing of said legs and disengagement of said gripping means and removing of said cover.

4. A method in accordance with claim 3 in which said plastic plug is punched to a position substantially in said opening.

5. A method for attaching a plastic cover having a flange with at least one pair of spaced resilient legs extending therefrom to a safety belt retractor frame having an opening for receiving said legs, said legs including gripping means to engage said frame to restrict withdrawal of said legs from said opening, said method comprising inserting said legs into said opening at least until said gripping means engages said frame and punching a plastic plug directly from said flange to between said legs; said plugs thereby holding said legs apart and preventing flexing of said legs and disengagement of said gripping means, said cover being supported in a die with said spaced legs extending toward said retractor frame and in registration with said opening, said legs being inserted into said opening by driving said die and retractor frame together, and said plastic plug being punched by driving a staking pin through said flange.

6. A method in accordance with claim 5 in which said die includes an impact surface facing away from said retractor frame and said staking pins are cooperatively associated with said die and extend from adjacent said flange at said spaced legs to a selected distance beyond said impact surface, said die and retractor frame are driven together by holding said retractor frame stationary and driving a ram against said impact surface of said die thereby forcing said die against said retractor frame, said ram also engaging said staking pin to drive it through said radial flange said selected distance.

7. A method for attaching a plastic cover to a safety belt retractor frame, said cover having a generally shallow cup shape with a flange extending radially from the open edge of the cup and a plurality of spaced pairs of resilient legs with gripping shoulders extending from the flange, said retractor frame having a plurality of openings each opening being adopted to receive one pair of spaced legs, said method of attachment comprising:

inserting said retractor frame into a holding frame for holding said retractor frame in a stationary position;

depositing said cover into a die having opening means in one end with a shallow cup shape to receive said cover with said legs extending toward said retractor frame in registration with the openings in said retractor frame, said die further including bores for receiving staking pins to adjacent said radial flange of said cover at said spaced legs, said staking pins extending through said die to a selected distance beyond an impact surface at the other end of said die facing away from said retractor frame;

driving a ram against said impact surface of said die, a spring means being disposed between said ram and said die so that said die is first driven to insert the spaced legs of said cover into the openings in said retractor frame at least until said shoulders engage said retractor frame, continuing motion of said ram to said impact surface serving to drive said staking pins through said radial flange by said selected distance to punch a portion of said flange to between said legs to prevent flexing of said legs and disengagement of said shoulders.

8. An apparatus for attaching a plastic cover having at least a pair of spaced legs to a safety belt retractor frame having an opening for receiving said legs, said apparatus comprising holding means for holding said retractor frame, support means adjacent said holding means for supporting said plastic cover with said legs in registration with said opening in said retractor frame, driving means cooperatively associated with said holding and support means for driving said holding and support means together to insert said legs into said opening and punch means cooperable with said support means for punching a plastic plug from said cover and inserting it between said legs to hold said legs tightly in said opening.

9. An apparatus in accordance with claim 8 in which said punching means is engageable by said driving means to punch out said plug when said driving means moves said holding and support means together.

10. An apparatus in accordance with claim 9 in which said support means is a die with a first end facing said holding means and shaped to receive said cover and a second end facing away from said retractor frame for impact with said driving means, said punching means comprising a staking pin extending through said die from adjacent said pair of spaced legs of said cover at said first end to beyond said second, impact end, and said driving means comprising a ram drivable against the impact end of said die to force the legs of said cover into said opening and to engage the staking pins to punch a portion of plastic from the cover to between said legs to hold them tightly in said opening.

11. An apparatus in accordance with claim 10 in which said holding means is a holding frame with outwardly extending sliding rails for sliding said retractor frame into proper position within the holding frame and an overhanging lip at the end of said rails to engage over the edge of said retractor frame to hold it stationary.

12. An apparatus for attaching a plastic cover of generally shallow cup shape with a radial flange and a plurality of pairs of spaced resilient legs extending from the flange to a safety belt retractor frame having at least one side plate with a plurality of openings, each opening adopted for receiving one of said pairs of legs, said machine comprising a holding frame for holding said retractor frame in a stationary position, a die associated with said holding frame and movable into a position closely adjacent said side plate, said die having a first end facing said side plate, said first end being recessed for receiving said cover with said spaced legs in registration with said openings in said side plate, said die also having a second end facing away from said first end, a plurality of staking pins, each pin extending through said die from said first end adjacent said flange at one of said pairs of spaced legs to a selected distance beyond said second surface, a ram spaced from said second surface of said die and a spring carried between said ram and die and engageable thereagainst said ram being movable to drive said die toward said retractor frame causing insertion of said spaced legs of the cover into the openings in the side plate of the retractor frame, movement of said ram to said second surface also driving said staking pins through said radial flange to punch a portion of said flange to between said legs to hold them apart firmly within said openings.

13. An apparatus in accordance with claim 12 in which said spaced legs of said cover includes radial shoulders to hook over the inside edge of the opening in said side plate when said legs are inserted into said openings, said legs also having cam surfaces between the ends of said legs and said shoulders to cam each pair of said resilient legs together for easier insertion through said opening, said spring between said ram and said die being stiffer than the resistance presented by said spaced legs being cammed together for insertion into said opening, whereby movement of said ram toward said die first drives said spaced legs into said openings and upon continuous movement of said ram said ram engages said staking pins to drive them through said radial flange to force a plastic plug from said flange to between each pair said legs to prevent said legs from flexing together and said shoulders from disengaging.

* * * * *